(No Model.)
H. J. GEBHARDT.
TEMPERATURE REGULATOR.
No. 388,034. Patented Aug. 21, 1888.
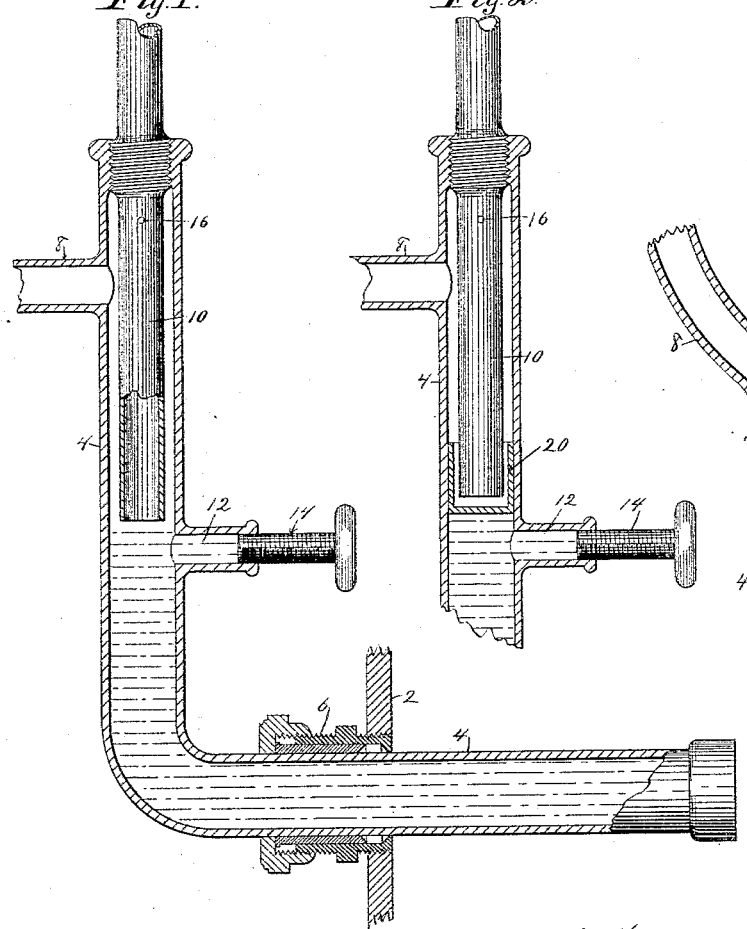
Witnesses.
S. J. Beardslee.
J. Jessen.
Inventor,
Henry J. Gebhardt,
By Paul, Sanford & Merwin Attys.

UNITED STATES PATENT OFFICE.

HENRY J. GEBHARDT, OF MINNEAPOLIS, MINNESOTA.

TEMPERATURE-REGULATOR.

SPECIFICATION forming part of Letters Patent No. 388,034, dated August 21, 1888.

Application filed November 30, 1887. Serial No. 256,490. (No model.)

*To all whom it may concern:*

Be it known that I, HENRY J. GEBHARDT, of Minneapolis, in the county of Hennepin and State of Minnesota, have invented certain new and useful Improvements in Temperature-Regulators, of which the following is a specification.

My invention relates to improvements in means for controlling the passage of gases or liquids through a valve port or opening; and the object I have in view is to provide a thermostatic device which will be affected by variations in the temperature of the chamber, room, or apartment in which it is located and will operate to control the passage of gas or liquid through a valve port or opening, and thereby govern the temperature at the point where the thermostatic device is placed.

The manner of applying the device permits of wide variation, according to the purpose for which it is used. The device may, for instance, be used to govern the feed of a gaseous or liquid fuel to a boiler-furnace, in which case the thermostat should be arranged in the boiler and operate to control a valve port or opening through which the fuel passes to the furnace. In other instances the thermostat may be located in a room or apartment whose temperature is to be regulated and control a valve port or opening through which steam, hot air, or other heating medium passes to the room or apartment.

Another object of my invention is to provide means for predetermining the temperature at which the thermostatic device will open or close the port or opening through which the gas or liquid passes.

Other objects of the invention will appear from the following detailed description, taken in connection with the accompanying drawings, in which—

Figure 1 is a longitudinal section of my improvement, shown in connection with a steam-boiler for regulating the flow of gas or liquid to be used as fuel. Figs. 2 and 3 are modifications of this device. Fig. 4 is a section of a globe-valve, showing my invention connected therewith.

In the drawings, 2 represents the boiler-head, in which the tube or pipe 4 is inserted. Between this pipe and the head a steam-tight joint is made, preferably by means of the stuffing-box 6. The pipe 4 is closed at its inner end and is made of sufficient size and length to form a chamber for the reception of a suitable quantity of mercury or other expansible liquid to give the required variation to the valve. The portion of the pipe outside of the boiler-head may be bent or turned upward, and at a convenient distance above this bend an inlet pipe or tube, 8, may be provided, opening into said pipe 4. An inner pipe, 10, is preferably passed into the pipe 4 and is carried to a given point below the inlet-pipe 8. An air-tight joint is formed between the pipe 10 and the upper extremity of the pipe 4; but, the pipe 10 being of smaller diameter than the interior of the pipe 4, an annular space is left between the two, and a free passage, preferably equal to the area of the pipe 8, is allowed from the inlet downward to the end of the pipe 10. The chamber formed by the pipe 4 is filled with mercury or other suitable liquid to a point within a given distance of the end of the pipe 10, leaving a free passage from the inlet-pipe 8 around the pipe 10, downward and between the surface of the liquid and the end of said pipe 10, and thence outward through the interior of said pipe 10.

I have shown in this construction the device as particularly adapted for use in regulating the flow of a gaseous or liquid fuel for maintaining the combustion under the boiler in which the tube 4 is located, the inlet-pipe 8 being connected with any suitable reservoir for the supply of the fuel and the pipe 10 being connected to the fire-box in any convenient manner. I prefer to provide a device in connection with the chamber which holds the mercury by which the capacity of this chamber may be varied at will, and thereby the normal relation between the mercury and the valve-port may be changed at will and the degree of expansion or contraction required to close or open the valve be determined. The device that I prefer for this purpose is as follows: An opening, 12, is formed in the tube 4 below the line of the liquid. The interior of this opening is screw-threaded, and a spindle, 14, is fitted in this screw-threaded opening, and by advancing this spindle in the opening the liquid in the tube will be displaced and the surface line raised and by receding the spindle the surface line will be lowered. An aperture, 16, is preferably provided in the tube 10, connecting the interior of the said tube 10 with the interior of the tube 4 at some point above the highest line of the expanding liquid. This aperture is made of sufficient size to allow a small amount of the gas or other fuel to pass through the pipe 10 in order to maintain the combustion in the fire-box and prevent the fire from being entirely extinguished when the flow through the pipe is cut off by the expanding liquid.

The operation is as follows: When the expanding liquid in the tube 4 is at a low temperature, the surface line will be below the end of the tube 10 and the passage will be open for the flow of the gas from the inlet-pipe 8 through the outlet-pipe 10. As the steam and temperature are raised in the boiler, the liquid in the tube 4 expands and the surface line rises in the said tube, reducing the space between it and the end of the said pipe and correspondingly reducing the flow until the surface of the liquid is finally brought in contact with the end of the pipe or port opening. The flow will be cut off at the mouth of the pipe 10. A slight flow will be maintained through the aperture 16 for igniting rather than heating purposes. A given temperature will secure a given amount of expansion of the liquid in the tube 4, so that when the mouth of the pipe 10 is sealed by the contact of the liquid it will so remain until the temperature is reduced, when the column of expanding liquid will fall and communication will again be established between the pipes 8 and 10.

I do not confine myself to this construction, as variations may be made both in the application and construction without departing from my invention.

In Fig. 2 I have shown a modification in which a cup shaped valve, 20, is arranged to slide in the chamber which contains the mercury and be raised and lowered by the expansion or contraction of the liquid in the said pipe directly in contact therewith, and the said valve, being forced upon a seat over the mouth of or a port in the pipe 10, closes this pipe or port and shuts off the flow through the said pipe. In some instances it will be better not to have material fed through the pipes come in contact with the expanding liquid, and for this reason I have supplied this modification.

In Fig. 3 I have shown a modification in which the pipes 8 and 10 are both connected with the pipe 4 in the shape of a Y, so as to form a port over the surface of the expanding liquid, which is closed by the said liquid as it rises in the tube, as before described.

In Fig. 4 I have shown a modification in which the valve 20 of an ordinary steam or water pipe, 22, may be operated by the direct action of the expanding liquid. In this case the main portion of the chamber containing the expanding liquid, which corresponds to the pipe 4, may be located at any desired point to bring it within the range of the temperature by which the valve is to be operated. A tube connects this chamber with a chamber, 24, above the valve, and are both filled with expanding liquid. The walls 26 of this chamber are made extensible, and the said chamber is capable of being contracted or expanded sufficiently to properly open and close the valve. The operation of this device is similar to that already described, except that the tube containing the expanding liquid is filled with the said liquid and the motion of the valve is accommodated by a flexible connection or diaphragm on the said valve. The expanding liquid in this as in the other cases acts directly upon the valve, and the difference in expansion caused by the temperature actuates the said valve and regulates the flow. The regulating-spindle 14 or some equivalent device is preferably used in connection with each of the modifications described, so that when the temperature is at any required point and it is desired to close the valve or stop the flow the spindle can be operated until this result is effected, and after the valve is once set in this way it will always close when the temperature rises to this point until it is set for another temperature.

I claim as my invention—

1. The combination, in a temperature-regulator, of a chamber, a body of expansible liquid contained therein, a regulating-piston, 14, for increasing or decreasing at will the capacity of said chamber, and thereby predetermining the degree of temperature at which the valve will open or close, a valve resting directly upon said liquid and adapted to be moved by the liquid as it expands or contracts in volume, and a valve-port adapted to be opened or closed by said valve.

2. The combination, in a temperature-regulator, of the tube 4, the body of liquid contained therein, the regulating-piston 14, connected with said tube and adapted to increase or decrease the interior capacity of said tube 4, and thereby to raise or lower the surface line of the liquid in said tube, the pipe 8, connected with said tube 4, and the pipe 10, extending into said tube and adapted to be closed and opened by the rising and falling of said liquid, substantially as described.

In testimony whereof I have hereunto set my hand this 25th day of November, 1887.

HENRY J. GEBHARDT.

In presence of—
R. H. SANFORD,
A. M. GASKELL.